United States Patent [19]

Ernst et al.

[11] Patent Number: 4,819,546
[45] Date of Patent: Apr. 11, 1989

[54] DEVICE FOR MEASURING FEED MOVEMENT

[75] Inventors: Alfons Ernst, Traunreut; Alfons Spies, Seebruck, both of Fed. Rep. of Germany

[73] Assignee: Dr. Johannes Heidenhain GmbH, Traunreut, Fed. Rep. of Germany

[21] Appl. No.: 35,208

[22] Filed: Apr. 7, 1987

Related U.S. Application Data

[63] Continuation of Ser. No. 551,281, Nov. 14, 1983, abandoned.

[30] Foreign Application Priority Data

Dec. 2, 1982 [DE]  Fed. Rep. of Germany ....... 3244616

[51] Int. Cl.$^4$ ............................................. F01B 25/26
[52] U.S. Cl. ........................................ 92/5 R; 92/88
[58] Field of Search ...................... 92/5 R, 88

[56] References Cited

U.S. PATENT DOCUMENTS

| | | |
|---|---|---|
| 2,699,757 | 1/1955 | Törnkrist . |
| 3,820,446 | 6/1974 | Granbom .................... 92/88 |
| 3,833,303 | 9/1974 | Burns et al. . |
| 4,164,893 | 8/1979 | Granbom .................... 92/88 |
| 4,170,826 | 10/1979 | Holstein .................. 33/125 C |
| 4,176,586 | 12/1979 | Stoll ........................ 92/5 R |
| 4,279,195 | 7/1981 | Miller ........................ 92/88 |
| 4,400,880 | 8/1983 | Nelle ..................... 33/125 C |
| 4,423,664 | 1/1984 | Buchl ...................... 91/520 |
| 4,471,304 | 9/1984 | Wolf ........................ 92/5 R |
| 4,481,869 | 11/1984 | Garlapaty ................. 92/88 |

FOREIGN PATENT DOCUMENTS

| | | |
|---|---|---|
| 0040684 | 12/1981 | European Pat. Off. . |
| 1814785 | 6/1970 | Fed. Rep. of Germany . |
| 338717 | 12/1970 | Fed. Rep. of Germany . |
| 2605020 | 12/1976 | Fed. Rep. of Germany . |
| 2631233 | 4/1978 | Fed. Rep. of Germany . |
| 2712421 | 9/1978 | Fed. Rep. of Germany . |
| 2943506 | 5/1981 | Fed. Rep. of Germany .......... 92/88 |
| 3110337 | 10/1982 | Fed. Rep. of Germany . |
| 3113962 | 10/1982 | Fed. Rep. of Germany . |
| 73655 | 6/1970 | German Democratic Rep. . |
| 255457 | 1/1949 | Switzerland . |
| 416133 | 6/1966 | Switzerland . |

Primary Examiner—Edward K. Look
Attorney, Agent, or Firm—Willian Brinks Olds Hofer Gilson & Lione

[57] ABSTRACT

A measuring system is disclosed which is integrated into a feed arrangement in such a way that the structural size of the feed arrangement is not increased significantly. In the disclosed embodiments, the feed arrangement includes a compressed air cylinder which includes a hollow profile and a piston movable within a cylinder defined by the profile. In one embodiment, a measuring scale is positioned within a groove formed within the hollow profile and this measuring scale defines a magnetic measuring graduation which is scanned by a scanning unit accommodated in the piston of the air cylinder.

6 Claims, 3 Drawing Sheets

DEVICE FOR MEASURING FEED MOVEMENT

This application is a continuation of application Ser. No. 06/551,281, filed Nov. 14, 1983 now abandoned.

BACKGROUND OF THE INVENTION

The present invention relates to a device for measuring feed movement of the type comprising a measuring scale and a scanning unit for scanning the scale.

Path measuring systems of the type conceived generally as length measuring systems are known to the art. One type of such path measuring system includes an incrementally graduated scale which is housed within an extruded aluminum housing. See, for example, West German DE-OS No. 27 12 421. In this prior art system a scanning unit is provided for scanning or reading the measuring scale, and the scanning unit is mounted within an aluminum housing. A follower which defines a cross-sectional shape of a two-edged sword is mounted to the scanning unit and is brought out of the aluminum housing through a longitudinal slit defined in the aluminum housing. The free end of this follower outside of the housing can be fastened to one of two machine components, the relative movement of which is to be measured. For example, such systems can be used to measure relative movement between the bed and slide piece of a machine tool.

In addition, it is known to the art that feed movements of machine components can be measured in systems in which the feed movements are brought about, for example by the movement of a piston in a cylinder. For example, compressed air cylinders can be used to move pistons without piston rods to provide the desired machine feed motion, and the change in position of the piston within the cylinder can be measured as an index of the machine feed motion. In the event a standrd measuring system such as that disclosed in DE-OS No. 27 12 412 is used to measure the feed movement of a piston without a piston rod in a compressed air cylinder, the overall size of the total apparatus is nearly double that of the compressed air cylinder alone.

SUMMARY OF THE INVENTION

The present invention is directed to an improved combined measuring/feed movement system which is simple and economical in manufacture, which is sturdy in use, and which is particularly well adapted for use in a system with small external dimensions.

According to this invention, a device for measuring feed movements of the type comprising a measuring scale and a scanning unit for scanning the scale is provided with a tubular housing which serves as a carrier for the measuring scale and which also defines an interior chamber. A shifting device, such as a piston for example, is disposed within the interior chamber of the tubular housing such that the shifting device is movable along the tubular housing in response to differential fluid pressure across the shifting device. The scanning unit is coupled to the shifting device such that movement of the shifting device along the tubular housing causes the scanning unit to move along the measuring scale. Further advantageous features of the invention are set forth in the dependent claims.

A particular advantage of this invention is that it integrates a measuring system into a feed system to provide a particularly compact, inexpensive and reliable system.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 3:
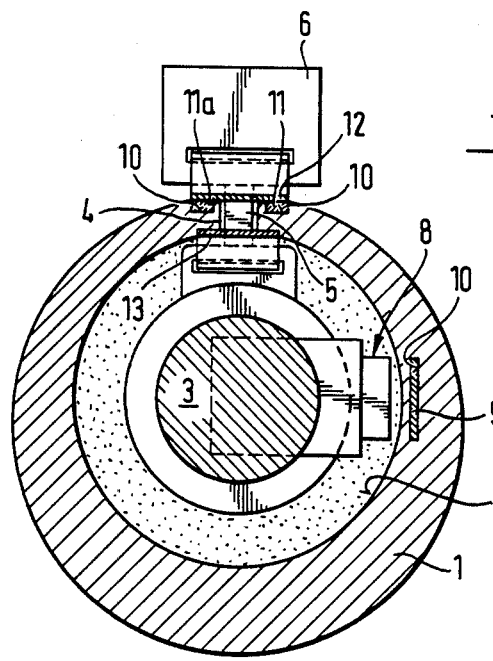
FIG. 3 shows a schematic cross-sectional view of a third preferred embodiment of this invention.
Figure 4:
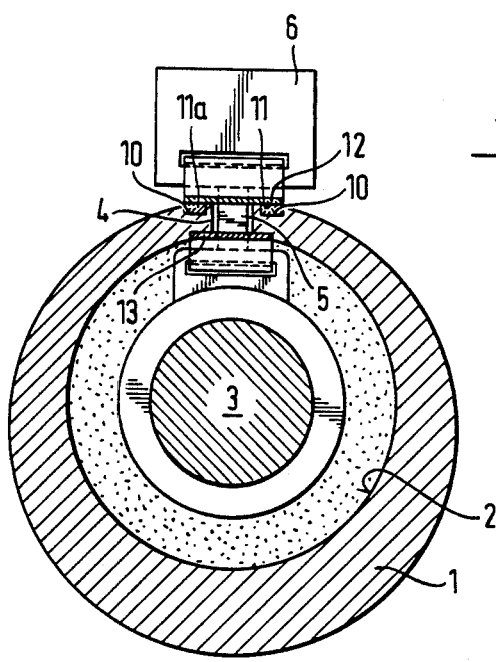
FIG. 4 shows a schematic cross-sectional view of a fourth preferred embodiment of this invention.
Figure 5:
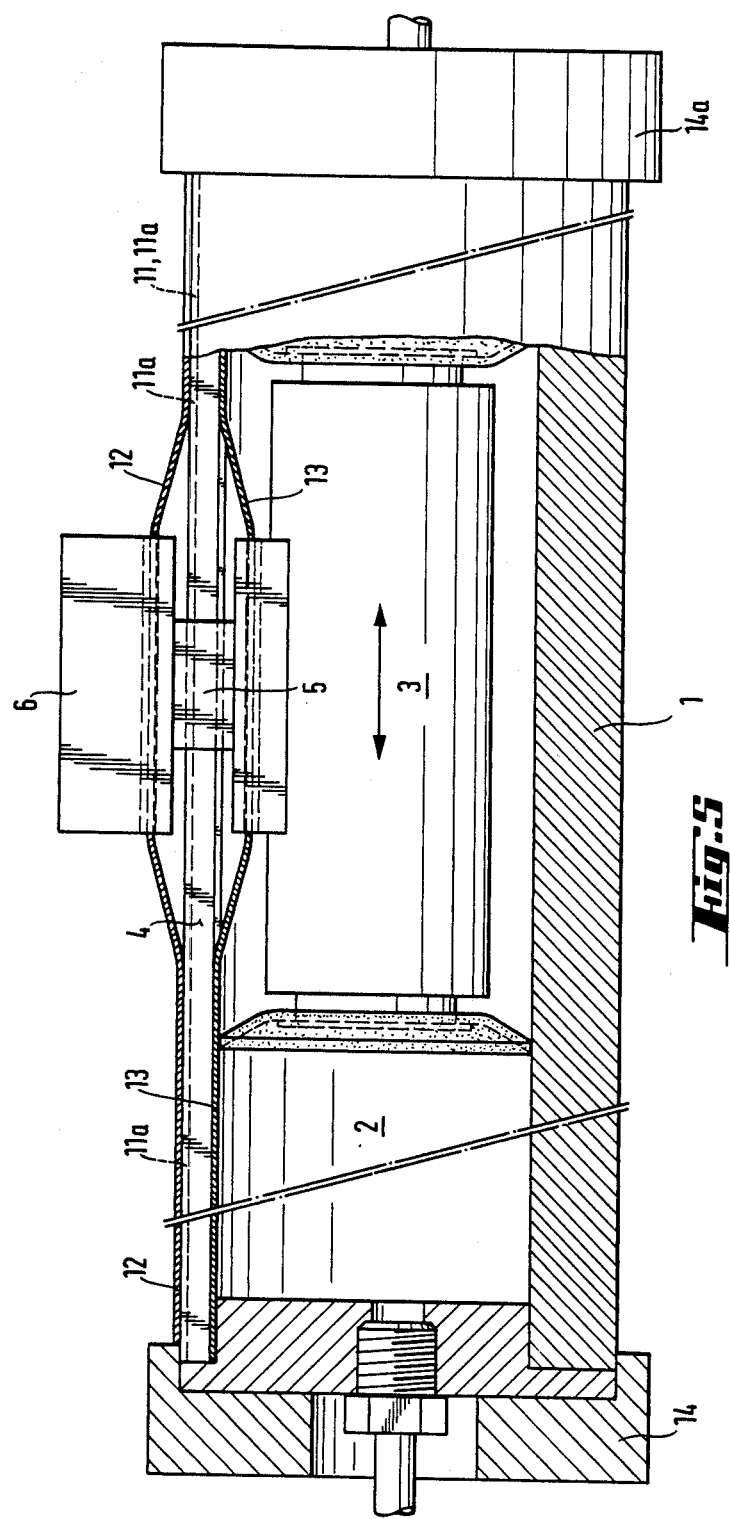
FIG. 5 shows a schematic longitudinal view in partial section of a device which illustrates features common to the devices of FIGS. 1-4.

Turning now to the drawings, FIGS. 1-4 show cross-sectional views of four preferred embodiments of this invention, and FIG. 5 shows a longitudinal view which illustrates in greater detail a number of features which are common to all four of the embodiments of FIGS. 1-4. Throughout the drawings, like reference numerals will be used to refer to similar elements in the various embodiments.

Figure 1:
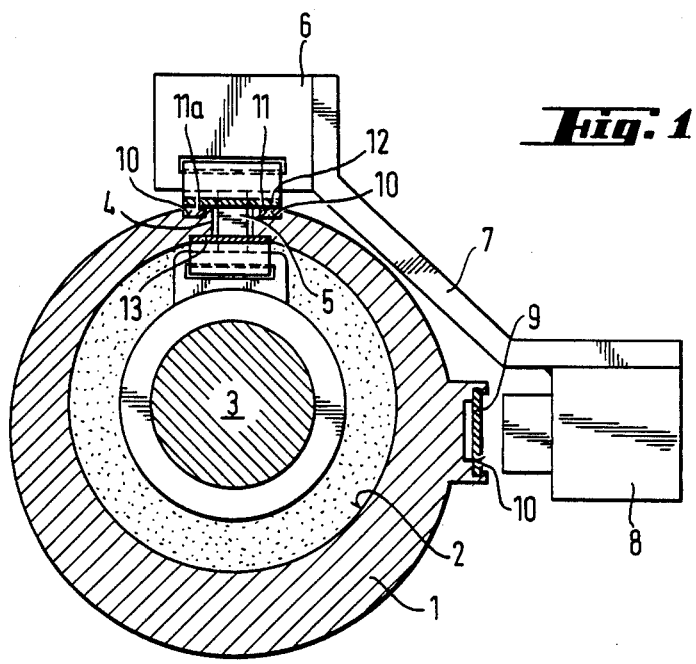
FIG. 1 shows a schematic cross-sectional view of a first preferred embodiment of this invention.

As shown in FIG. 1, the first preferred embodiment includes a hollow profile 1 which, for example, may be formed of an extruded light metal such as aluminum. This hollow profile 1 defines a cylindrical interior chamber 2 in which a piston 3 is translatorily movable. A longitudinal slit 4 is defined in the profile 1, and a transfer element 5 is coupled to the piston 3 and extends out of the profile 1 through the slit 4. The outermost end of the transfer element 5 defines a support member 6. An object (not shown) which is to be moved translatorily by means of the piston 3 can be fastened in any suitable manner to the support 6. In addition, the support 6 carries an angle element 7, to the free end of which is mounted a scanning unit 8. The scanning unit 8 is mounted to scan a measuring scale 9 which is mounted to the profile 1 within a groove 10 defined in an exterior surface of the hollow profile 1. In the illustrated embodiment of FIG. 1, the measuring scale 9 slides within the groove 10 and is fixed in place in a suitable manner. The scanning unit 8 and the scale 9 can be made to operate according to any one of a large number of functional principles, including optical, opto-electronic, magnetic, capacitive or inductive principles.

In the event the functional principle of the scanning unit 8 and the scale 9 is not optical or opto-electronic, it is then possible to protect the scale 9 from damage by enclosing it within a wall defined by the profile 1.

Figure 2:
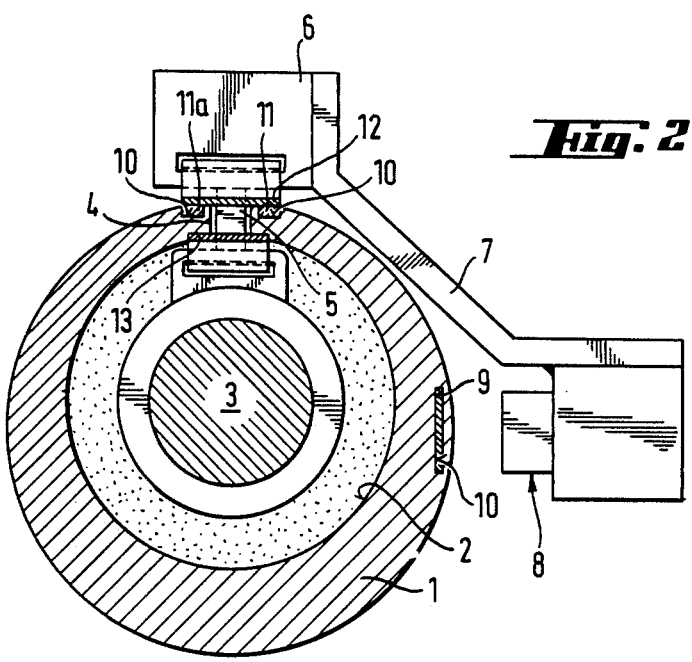
FIG. 2 shows a schematic cross-sectional view of a second preferred embodiment of this invention.

An embodiment which utilizes this approach is shown in FIG. 2. In this embodiment, the groove 10 which receives the measuring scale 9 is formed as a hollow space during the production of the hollow profile 1. This can be done for example in a relatively simple manner by means of extrusion pressing techniques. Thus, as shown in FIG. 2, the scale 9 is completely enclosed within a wall of the profile 1, and is thereby protected from damage. A magnetic measuring system is quite well suited for use in the embodiment of FIG. 2, since it is often desirable to form the profile 1 of a nonmagnetic material, such as aluminum or reinforced plastic.

FIG. 3 shows a third embodiment of this invention in which the size of the overall device is still further reduced. As shown in FIG. 3, the scanning unit 8 is integrated into the piston 3 and the measuring scale 10 is arranged in the wall of the hollow profile 1 in the vicinity of the cylindrical inner chamber 2. As before, a groove 10 is formed in the wall of the profile 1 to receive the measuring scale 9. The necessary cable connections between the scanning unit 8 and outside processing equipment are passed outside of the profile 1 via the transfer element 5. Such techniques are in widespread use in known encapsulated measuring arrangements, and the details by which the cables are passed outside of the profile 1 are therefore not shown in FIG. 3.

The embodiment of FIG. 3 minimizes the size of the overall system in that a complete length measuring system is integrated in a manner which does not increase the size of the original compressed air cylinder. As shown in FIG. 3, all components of the measuring system are enclosed within the profile 1 of the compressed air cylinder system.

This integration of the measuring and compressed air cylinder systems is further continued in the preferred embodiment shown in FIG. 4. The embodiments of FIGS. 1-4 all include a pair of magnetic strips 11, 11a which are positioned on both sides of the longitudinal slit 4 in the profile 1. These magnetic strips 11, 11a act to hold a ferromagnetic seal band 12 in place in order to close the longitudinal slit 4. In the zone of the piston 3 this seal 12 is lifted off of the magnetic strips 11, 11a and conducted through the support 6. A steel band which operates as a seal like the seal 12 is shown in Swedish published patent application No. 338,717.

In the preferred embodiment of FIG. 4, one of the two magnetic strips 11 is provided with a magnetic measuring graduation and the other magnetic strip 11a is provided with an array of magnetic reference marks. Such reference marks can be used for controlling the measuring system and are described, for example, in West German DE-OS 18 14 785. In the embodiment of FIG. 4 the magnetic graduations and reference marks encoded in the magnetic strips 11, 11a are scanned by means of magnetically responsive scanning elements (not shown in detail) which are mounted either in the support 6 to scan the graduation and the reference marks from the outside of the profile 1, or else in the piston 3 so that the scanning occurs from within the profile 1. In this embodiment, the magnetic strips 11, 11a therefore serve two separate functions: they define the measuring scale, and they hold the sealing band 12 in a sealing position in order to close the longitudinal slit 4.

FIG. 5 shows a longitudinal view in partial section of elements which are common to the embodiments of FIGS. 1-4. As shown in FIG. 5, the ends of the profile 1 are closed by means of end pieces 14, 14a. Compressed air or other fluids are passed into the enclosed chamber defined by the profile 1 and the end pieces 14, 14a via conduits included in the end pieces 14, 14a. The pressure differential across the piston 3 is arranged in order to cause the piston 3 to move in the desired feed direction. As shown in FIG. 5, an additional seal 13 is provided to seal the longitudinal slit 4 from within. This additional seal 13 is pressed in place against longitudinal slit 4 by pressurized fluid included within the profile 1.

Of course, it should be understood that a wide range of changes and modifications can be made to the preferred embodiments described above. Thus, for example, the interior chamber defined by the profile 1 does not have to be circularly cylindrical; other cross-sections of the hollow profile 1 can be used when appropriate for individual applications. Furthermore, the groove for receiving the measuring scale does not necessarily have to be formed during an extrusion or injection molding step; such as groove could be formed in the profile by a later milling operation, for example. In addition, the profile could be assembled out of a number of individual profile segments arranged end to end, and the profile could be curved if desired. Similarly, in some applications it may be preferable to form a measuring graduation directly on the sealing band 12 such that the sealing band 12 acts as a graduation carrier, or to form the measuring graduation directly on the hollow profile 1 such that the hollow profile 1 acts as a graduation carrier.

It is therefore intended that the foregoing detailed description be regarded as illustrative rather than limiting, and that it be understood that it is the following claims, including all equivalents, which are intended to define the scope of this invention.

We claim:

1. In a device for measuring feed movements comprising a measuring scale and a scanning unit for scanning the scale to produce at least one signal indicative of feed movement, the improvement comprising:

a tubular housing defining a wall and a longitudinal axis and comprising a chamber located in the wall and extending along the longitudinal axis, the chamber adapted to receive the mesuring scale, the tubular housing further comprising a cylinder and a slit in communication with the cylinder;

a piston disposed within the cylinder and movable along the cylinder in response to differential fluid pressure across the piston, the scanning unit coupled to the piston and arranged inside the tubular housing such that movement of the piston along the cylinder causes the scanning unit to move along the measuring scale; and a transfer member coupled to the piston to extend out of the cylinder through the slit.

2. A high precision device for accurately producing and measuring relative feed movement between a first and second relatively movable objects, the measuring device comprising:

a housing comprising an elongated interior shaft, the shaft defining a shaft wall and a slit extending substantially the length of the shaft for mechanical communication between the interior of the shaft and the exterior of the housing, the housing connectable to the first object;

a measuring scale positioned within the shaft wall along the direction of the shaft;

a rodless type piston movably disposed within the shaft;

a scanning unit coupled to the piston and positioned within the interior of the shaft;

a follower coupled to the piston and extending through the slit and connectable to the second object;

means for receiving a fluid to produce a fluidic differential pressure across the piston to move the piston, the scanning unit and the follower along the shaft such that the first object may be moved relative to the second object and such that the scanning unit scans the measuring scale to produce at least one scanning signal accurately representative of the relative movement between the first and second object.

3. The invention of claim 2 wherein the housing comprises a plurality of housing segments joined end to end to form the housing.

4. The invention of claim 2 wherein the measuring scale comprises a magnetic graduation.

5. The invention of claim 4 wherein the scanning signal is communicated exterior to the housing by wireless means such as electromagnetic radiation transmission.

6. In a device for measuring with high precision the relative feed movement between two relatively movable objects comprising a measuring scale and a scanning unit operative to scan the measuring scale and produce at least one scanning signal indicative of the relative movement between the two objects, the device defining a device length, the improvement comprising:
- a substantially closed housing defining an interior elongated chamber, the chamber defining a longitudinal axis, the housing defining an outer surface and adapted to carry the measuring scale interior to the outer surface of the housing, the housing defining an elongated sealable slit oriented substantially parallel to the longitudinal axis for mechanical communication into the chamber;
- a rodless piston disposed within the chamber and adapted to move along the chamber in response to fluidic differential pressure across the rodless piston;
- a coupling element to connect the scanning unit to the rodless piston such that the scanning unit is located within the chamber and movable with the rodless piston in response to fluidic differential pressure;
- a connecting elemnt attached to the piston and extending substantially perpendicularly to the longitudinal axis of the chamber for a length sufficient to pass through the slit to the exterior of the housing, the connecting element operative to mechanically communicate the position of the piston to at least one of the two objects;
- the rodless piston, connecting element and scanning unit operative to produce relative movement of the two objects in response to the fluidic differential pressure and to produce at least one scanning signal representative of the relative movement while substantially maintaining the length of the device constant.

* * * * *